Patented Aug. 12, 1930

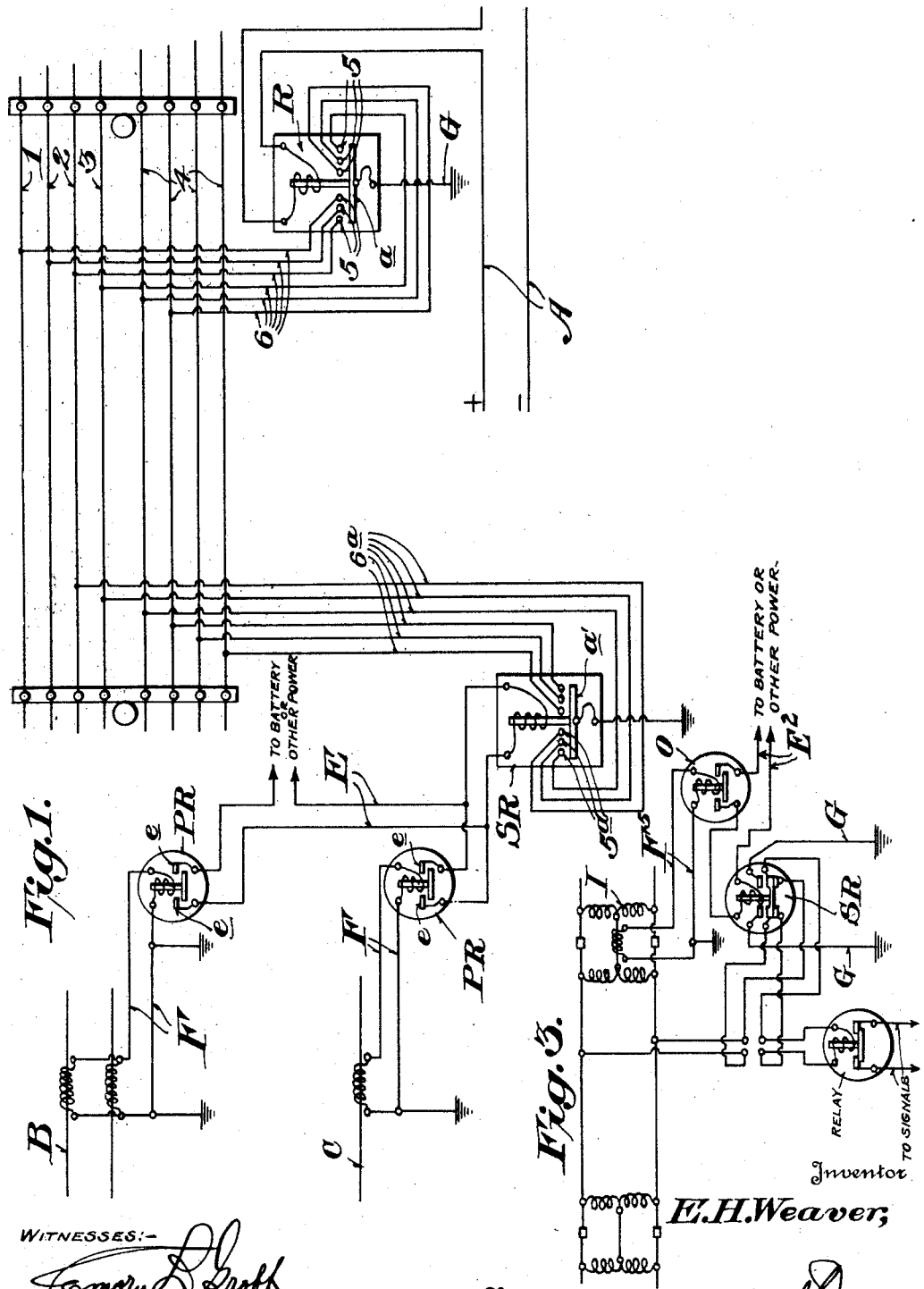

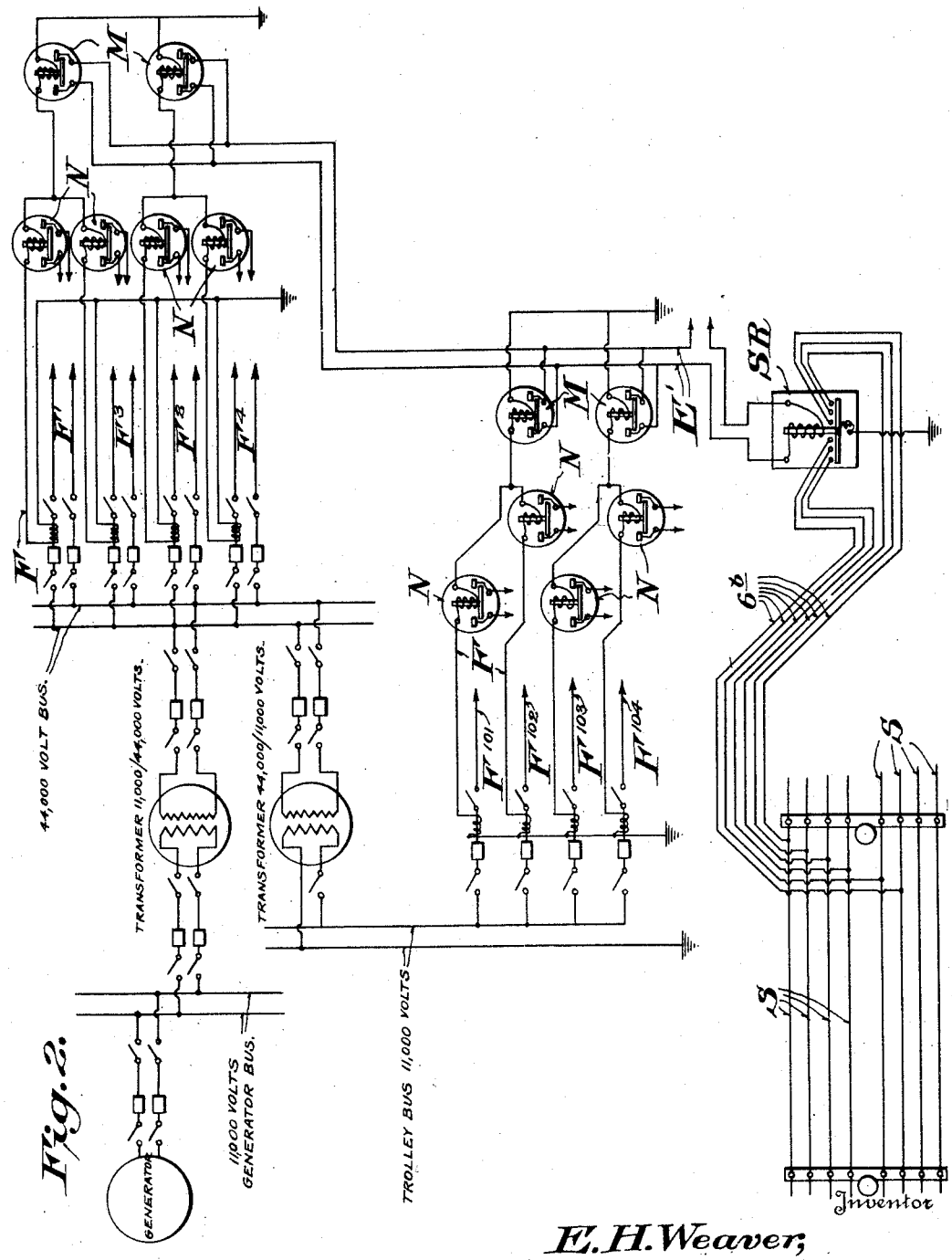

1,772,649

UNITED STATES PATENT OFFICE

EDWARD H. WEAVER, OF BLUEFIELD, WEST VIRGINIA

MEANS FOR PROTECTING TELEPHONE, TELEGRAPH, AND OTHER SERVICE LINES AGAINST INDUCED CURRENTS FROM ADJACENT POWER LINES

Application filed September 27, 1927. Serial No. 222,388.

This invention relates to a novel and practical means for taking care of induced currents caused from failure on electrification circuits, with a minimum delay.

To that end the invention contemplates a novel circuit arrangement including relays which automatically function upon the occurrence of a short circuit in an adjacent or proximate power line or when said line is overloaded, thereby to automatically ground the induced currents consequently set up between the power lines and adjacent telephone, telegraph, signal or other service lines in close proximity to the power feeders.

A further object of the invention is to provide a system of relays wherein the relays included in the power circuit are set to function ahead of the relays used to open the power circuits when shorts or overloads occur, thereby insuring the full protection of equipment during the period of induced current and also protection to persons maintaining equipment.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 of the drawings illustrates one arrangement adapted to be used in carrying the invention into effect.

Figure 2 is a diagram of a modified arrangement of circuits also adapted to carry the invention into use.

Figure 3 of the drawings illustrates another arrangement adapted to be used in carrying the invention into effect on two other different circuits.

Similar reference characters designate corresponding parts throughout the several figures of the drawings.

The difficulties incident to the setting up of induced currents in various service lines upon the failure or over-loading of power feeders has long been a hazard to life, a source of considerable annoyance and difficulty and considerable expense and loss of time in the maintenance of proper operating conditions on telephone, telegraph, signal and other circuits. Therefore, the present invention proposes to eliminate the difficulties heretofore encountered in a simple and practical way, and by reference to Figure 1 it will be observed that 1, 2, 3 and 4 respectively designate telephone, telegraph, wired wireless and signal circuits which are operated near direct and alternating power feeders A, B and C, the power feeder A being a direct current power feeder and B being an alternating current power feeder while C is an alternating current trolley feeder, by way of example.

Referring first to the direct current power feeder and its effect and operation in conjunction with the working circuits referred to, it will be observed that one side of the direct current power line A is included in circuit with the movable armature of a relay designated generally as R. The said armature of the relay is provided with a ground connection G and a plurality of shunt terminals 5 which are provided with shunt connections 6 leading to the work or service circuit wires 1, 2, 3 and 4 previously referred to. The relay R is normally open as shown, and when an overload or short circuit occurs in the direct current power feeder line, the armature $a$ of the relay R is automatically closed thus grounding all of the shunt connections 6 through the terminals 5. When the disturbance is relieved by the circuit breaker in the power circuit A the relay R will automatically open, thus relieving the working circuits 1, 2, 3 and 4 of the ground connection and restoring normal operation.

In connection with the alternating current feeders B and C it will be observed that there is provided a secondary relay SR, the same having its movable armature $a'$ provided with a ground connection G and the said armature being adapted to operate in conjunction with a series of shunt terminals $5^a$ which are electrically connected with the service lines or circuits through the medium of the shunt connections $6^a$. The said armature $a'$ of the secondary relay is shown in its normally open position in Figure 1 and is adapted to be included in a circuit which is closed by one or more primary relays PR. That is to say, the primary relays PR are provided with contact terminals $e$ which are included in a battery or other circuit designated generally as E, and the armatures of said primary relays are included in the transformer circuits F so that upon the occurrence of a short or overload, the primary relay is energized from the current transformer circuit F. When the relay becomes energized it closes the contacts $e$, thereby completing circuit to the secondary relay SR which automatically closes thereby grounding the service lines. When the circuit breaker in the power circuits B or C is opened due to short circuit or overload, the current transformer circuit F becomes deenergized thereby releasing primary and secondary relays and restoring the circuits again to normal.

It will of course be understood that the relays R and PR are set to function ahead of the relays used to open the power circuits when shorts or overloads occur, thereby protecting service equipment during the period of induced current. As soon as the relays in the power system operate, the service system is relieved of the disturbance and all relays are automatically released thereby restoring the circuits to normal.

Figure 2 of the drawings illustrates a further application of the invention wherein the service lines designated generally as S are connected by shunt connections $6^b$ with the shunt terminals of the secondary relay SR. The grounded armature of the secondary relay is included in the battery or equivalent circuit E' which also includes a plurality of primary relays M and N. The armatures of the primary relays M and N are included in current transformer circuits F which are responsive to inductive disturbances in the feeder lines $F^1$, $F^2$, $F^3$, $F^4$ and $F^{101}$, $F^{102}$, $F^{103}$ and $F^{104}$. In this arrangement, if a short circuit should develop on feeder $F^{101}$, primary relays M and N operate immediately but relay M is set to function ahead of relay N thereby grounding circuits through relay SR prior to relay N breaking the power circuit through the oil circuit breakers. As soon as relay N functions the power system is relieved of its disturbance and the current transformer F is deenergized. This automatically releases relays M, N and SR from ground circuits.

Figure 3 of the drawings shows a further means for carrying the invention into effect in connection with a signal track circuit. The secondary relay SR is provided with ground terminals and ground connections G and the primary relay O includes terminals adapted to be included in a battery or other circuit $E^2$ thereby to close the circuit to the armature of the secondary relay when the armature of the primary relay is energized from the current transformer circuit $F^5$, the said current transformer being coupled with an impedance bond I arranged across the signal circuit. At the time secondary relay SR operates it opens circuit to signal relay before grounding line side of same. This type of relay is also adaptable to be used as a secondary relay, shown in Figs. 1 and 2. By changing the primary relay circuit and the relay in Fig. 3 this form of system can be operated from direct current track circuit.

From the foregoing it will be apparent that a distinctive feature of the invention resides in connecting the service lines which operate near power lines with an automatic relay which grounds the service lines during the period of the induced current, thereby not only insuring safety to personnel but safety to equipment when unusual conditions occur in the power line.

Without further description it is thought that the features and advantages of the invention will be readily apparent to those skilled in the art, and it will of course be understood that changes in the form, proportion and minor details of construction may be resorted to without departing from the spirit of the invention and scope of the appended claims.

I claim:—

1. Means for protecting telephone, telegraph, signal and other circuits operated near electric power lines, comprising a relay having a ground connection and shunt terminals, shunt connections between said circuits and the shunt terminals, and means for actuating the relay when surging occurs in the power line to connect the shunt terminals with the ground, said means comprising a source of electrical energy and inductance operated means for closing the circuit from said source of electrical energy to the relay.

2. Means for protecting telephone, telegraph, signal and other service circuits operated near electric power lines comprising a secondary relay having a normally inoperative ground connection, shunt terminals on said secondary relay, shunt connections between the said service circuits and the shunt terminals, a source of electrical energy, a primary relay having terminals included in circuit with the source of electrical energy and with the secondary relay, and means for actuating the primary relay to close the last mentioned circuit with the secondary relay comprising a transformer circuit responsive to surging in the power lines.

3. Means for protecting telephone and telegraph signal and other circuits operated near alternating and direct current power lines, comprising a relay having a ground connection and shunt terminals, shunt connections between said circuits and the shunt terminals and said relay being included in a part of the direct current power line circuit, and a system of primary and secondary relays for the alternating current lines, the secondary relay including a ground connection and shunt terminals, shunt connections between said circuits and the shunt terminals, a source of electrical energy for the secondary relays, and transformer circuits including the primary relays, whereby upon the occurrence of surging in an alternating current line the primary relays will be actuated to connect said source of electrical energy with the secondary relay.

In testimony whereof I hereunto affix my signature.

EDWARD H. WEAVER.